Sept. 1, 1959 P. M. PAPPAS 2,902,582
FRYING APPARATUS
Filed Jan. 17, 1958 2 Sheets-Sheet 1
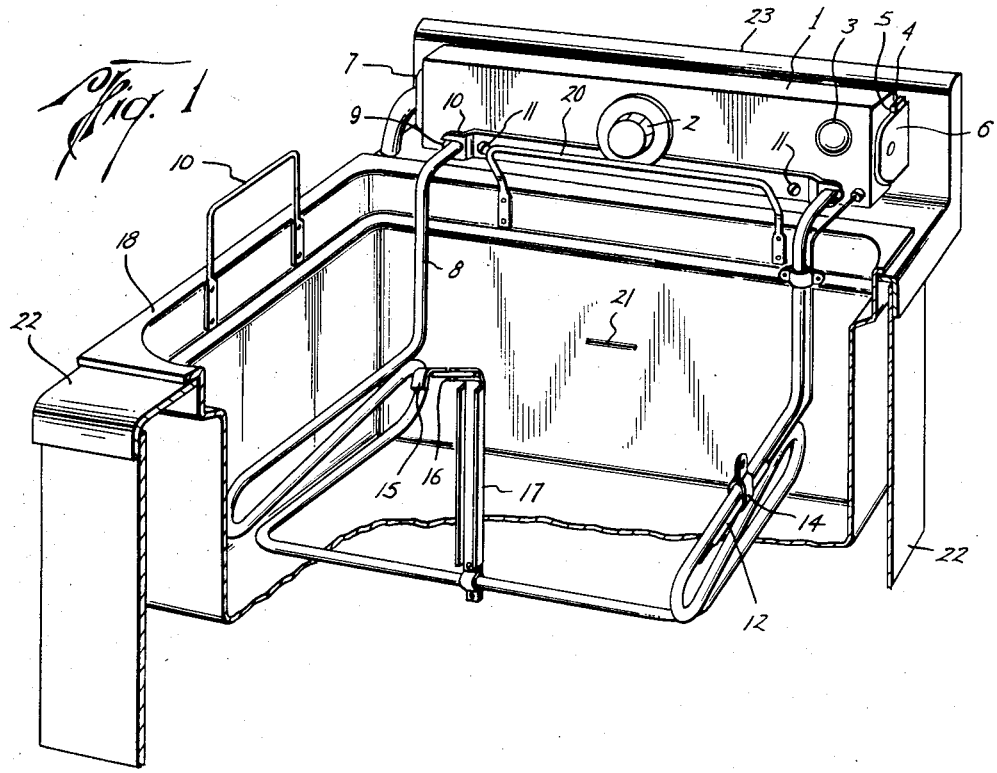
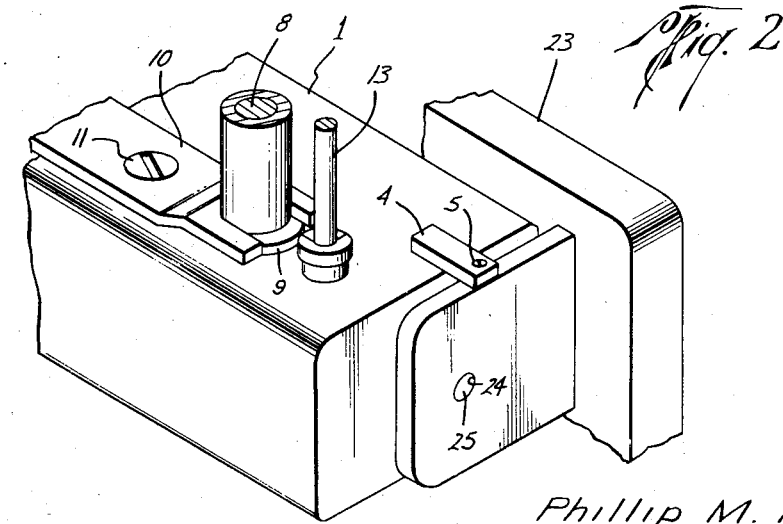
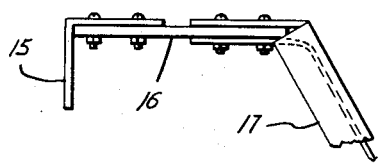
Phillip M. Pappas
INVENTOR.
BY
ATTORNEYS Sept. 1, 1959 P. M. PAPPAS 2,902,582
FRYING APPARATUS Filed Jan. 17, 1958 2 Sheets-Sheet 2

Phillip M. Pappas
INVENTOR.

BY
ATTORNEYS

United States Patent Office 2,902,582
Patented Sept. 1, 1959

2,902,582

FRYING APPARATUS

Phillip M. Pappas, Houston, Tex.

Application January 17, 1958, Serial No. 709,674

4 Claims. (Cl. 219—44)

This invention relates to a frying apparatus and more particularly to commercial electric deep fryers with immersion resistance heating elements suspended into a frying container or pot containing cooking oil or fat with wire baskets provided for lifting and removing the foods being fried.

Ease of cleaning and sanitation are of paramount interest to the restaurant user, and lift-out frying containers or pots that can be easily removed and washed in the sink are increasing in their popularity with the restaurant trade.

An object of the invention is to provide a self-contained control box assembly enclosing and supporting all electrical components and wiring independent of the casing or cabinet, said box assembly being capable of pivoting upward when installed on the casing or cabinet for easy pot removal and with said box assembly easily removable or attachable to said casing or cabinet to facilitate easy replacement and/or exchange in case of elements, thermostat or wiring failure, thus eliminating down time and expensive service calls.

Another object of the invention is to provide not only easy removal of the frying container or pot for sanitary cleaning in a sink, but also by providing a heavy oil-resistant grounded flexible supply cord with strain relief where same attaches to box assembly, the entire fryer unit can be easily removed for cleaning and sanitizing the area under and around the fryer by means of plug-in installation and/or removal.

Another object of the invention is to provide automatic hazard-free element cleaning for high heating efficiency and long trouble-free element life, as gums and sediment accumulating on immersion element rods have an insulating effect that cuts efficiency and shortens element life unless frequently removed.

A further object of the invention is to eliminate fire hazard from a lowered fat level which occurs when oil or fat absorbed by the foods fried is not replaced promptly.

Another object of the invention is to provide rigid element mounting to the box assembly with quick, easy element removal and replacement without tools other than a screwdriver.

Another object of the invention is to provide a self-contained control box assembly with all necessary components including power supply cord and plug so that multiple unit users can always utilize all their fryers by having a single extra box assembly to immediately replace when one becomes defective. They can then return the defective box assembly parcel post for factory repair and return.

A further object of the invention is to provide custom fabricators and foreign assemblers with box assemblies for installation in special built counter or cabinets made locally by themselves thus suiting individual users' particular requirements, or in the case of foreign assemblers, by fabricating their own casings or cabinets, duty and transportation costs will be greatly reduced.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a front elevation of the fryer unit partly cut away to show the association of the components of my invention.

Figure 2 is a sectional view of the pivoting control box assembly in its raised position to facilitate pot removal and/or burning off the gum and sediment deposits from the heating element tubes.

Figure 3 is a side elevation of the top portion of the insulated element lift-up handle.

Figure 4:
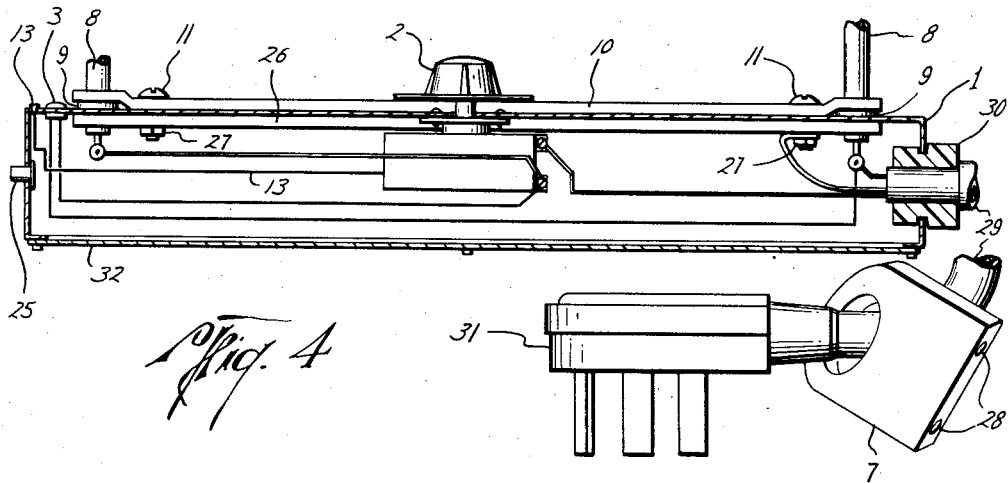
Figure 4 is a top view of the control box assembly with the top cut away to show the torsion bar element suspension, the interior terminals and wiring and the power supply cord and mounting bracket.
Figure 5:
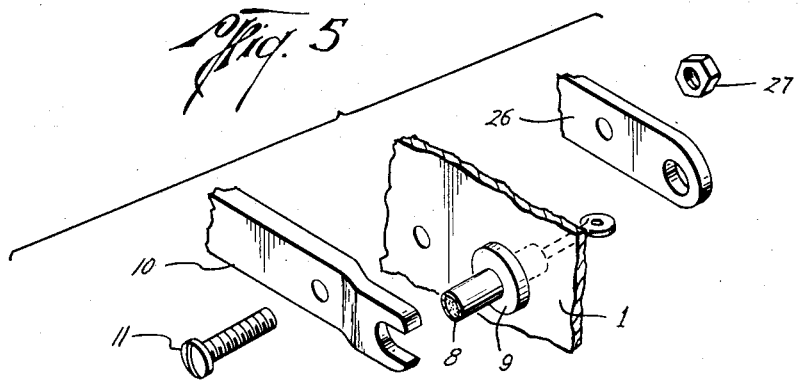
Figure 5 is an exploded assembly drawing showing how the element is attached and held rigidly in alignment to the control box assembly.

Referring to the drawings, Figure 1 shows the enclosed control box assembly 1 with thermostat 2 and pilot indicating light 3. Latch 4 is attached to bracket 6 by means of screw 5. With the control box in its operating position, latch 4 is parallel with mounting bracket 6, whereas latch 4 is turned over the face of box 1 when the control box and element are rotated upward as shown in Figure 2. The box 1 pivots or rotates by means of brackets 6 and 7 which have clearance holes for pin 25 attached to one side of the box and strain relief bushing 30 attached and holding cord 29 on the other end of said box as shown in Figure 4. To remove the entire control box assembly unit it is only necessary to unscrew two bolts which are inserted behind backsplash 23 and remove them from tapped holes 28 in mounting bracket 7. This allows pivot pin 25 to be slid out of hole 24 in bracket 6 allowing the entire box assembly to be removed for repair or replacement. Element 8 is rigidly mounted to box 1 by means of thick torsion bar 10 which is slotted at both ends to fit around the element rods and is die offset at both ends so that when element bolts 11 are tightened through the holes in the front bar 10, the box 1, and the inner alignment bracket 26 by means of nut 27 as shown in detail in Figure 5. This tightening action causes torsion bar 10 to bear strongly against washer 9 attached to element 8. The semi-circular slot in bar 10 and the element hole in thick inner alignment bracket 26 insures proper alignment of the element and prevents any play or movement which could cause the element terminals inside of the box to short out against the inner bottom box surface.

It will be further noted that with the simple removal of the two bolts 11 the entire element is free to be removed or replaced.

In cooking, fry pot 18 supported in casing 22 is filled with cooking oil or fat up to the indicating mark 21 on the rear of the pot. Element 18 is energized by turning on thermostat 2 to the proper dial temperature. Indicating light 3 stays on until the dial set temperature is reached. The heating of the cooking fat around thermostat bulb 12 causes hydraulic fluid therein to expand up through capillary wire 13 to the inner bellows assembly of the thermostat 2 which breaks the circuit when the dial set temperature is reached.

Baskets containing food are then inserted in the fat and the cooling action causes the thermostat to make the circuit energizing element 8. When the food is cooked the baskets are hung on bracket 20 to drain.

At the end of the day control box 1 and element 8 are rotated upward by lifting handle 15 upward and turning latch 4 across the face of box 1 to hold the control box 1 and element 8 in an upward position.

It will be noted that lift-up bracket 17 is attached to the lower front portion of the heated element rod and as same is very hot after cooking in 350 degree fat and I have insulated handle 15 as shown in Figure 3 to prevent burned fingers. Bracket 17 is connected to bracket handle 15 by means of high temperature plastic 16 which insulates handle 15 and keeps same relatively cool.

Figure 6:
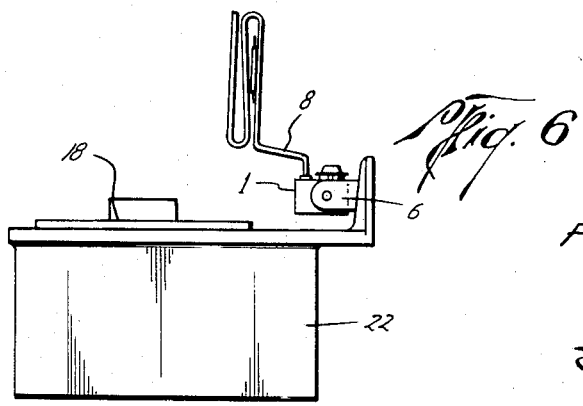
Figure 6 is a side elevation of the fryer unit with element in its upward position as shown in detail in the section shown in Figure 2.

When box 1 and element 8 are rotated up as shown in Figure 2 and Figure 6 the sediment and gum deposits accumulated from frying can be burned off by turning thermostat 2 to its highest setting (about 400° F.). In open air the element surface will get very hot within one to two minutes, but as shown in Figure 1 aluminum strap 14 which holds thermostat bulb 12 securely to horizontal element rod 8 conducts sufficient heat to thermostat bulb 12 to cause thermostat 2 to cut off before the ignition point of fat is reached and before the element reaches destructively high temperature. This arrangement also prevents fire hazard or danger when cooking foods as said foods absorb fat which should be replaced to keep the fat level up to indicating mark 21 on the rear of pot 18. When the fat level drops below the top horizontal portion of heated element 8 or even below thermostat bulb 12, strap 14 conducts sufficient heat to bulb 12 to cut off the current before the ignition point of the fat is reached and before the element reaches destructively high temperature.

After the sediment and gum are burned off the element it can be wire brushed and the surface will be bright and clean ready for efficient reuse.

Pot 18 is then removed by means of handles 10 from casing 22 and the fat is poured out and strained. The pot is cleaned and placed in casing 22. Latch 4 is turned so control box assembly rotates downward placing element 8 into pot 18 and with the fat back up to indicating mark 21, the unit is ready for another day's frying.

In Figure 4, looking down on the control box assembly with the top cut away, 1 is the box casing. Thermostat 2 is mounted therein with dial 2 on the outside and the bellows snap mechanism and contacts inside. The indicating light 3 snaps into a hole in box 1. Element 8 is held rigidly in place by means of bolts 11 and nuts 27 as previously described. Also, one nut 27 serves to hold the ground terminal from grounded power supply cord 29.

The control box assembly pivots or rotates by means of pin 25 located in a hole 24 in bracket 6 and cord strain relief bushing 30 inside the hole in bracket 7.

Flexible supply cord 29 is secured by strain relief bushing 30 where it enters box 1 and has a three-prong grounded plug cap at its outer end for mounting into a receptacle for power supply.

Box 1 is closed on the back by means of removable rear cover plate 32.

It will be noted that any twist or flexing when rotating box 1 is distributed over the entire length of heavy duty flexible supply cord 29 and that no internal wiring or terminals are subjected to strain or stress.

Also it should be noted that all terminals, associated wiring and operating contacts of the thermostat 2 are enclosed within box 1 when the unit is either in its cooking position or in its raised position for cleaning. This is very important with electric fryers as cooking oil splatter and mist associated with deep frying can easily cause malfunction of electric wiring terminals and contacts.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such alterations or changes as shall fairly fall within the scope of the appended claims.

What I claim is:

1. An electric heater for deep fat fryers of the type including an open top fry pot, a casing supporting said fry pot, and a splash back extending upwardly from said casing comprising a pair of spaced apart parallel mounting brackets adapted to be secured to said splash back and to extend forwardly therefrom, a generally rectangular box having spaced front and rear walls, spaced top and bottom walls and spaced opposite end walls, an outwardly extending journal pin secured centrally to one of said end walls, a cylindrical hollow bushing secured centrally to the other of said end walls and extending therethrough, said journal pin and said bushing being journalled respectively in said brackets, an electric power cable supported in and extending through said bushing, a tubular electric heating element, a washer rigidly secured to each end of said heating element, said heating element having its opposite ends extending through the front wall of said box with said washers in engagement with the outer face of said front wall, a pair of elongated bars having their opposite ends engaging the opposite ends of said heating element with said washer and said front wall of said box positioned therebetween, means releasably securing said bars together clamping said washers to said front wall, and means electrically connecting said power cable to said heating element.

2. A device as claimed in claim 1 where a latch member is pivotally secured to one of said brackets for releasably securing said box and said heating element in one position of adjustment in said brackets.

3. A device as claimed in claim 1 wherein one of said bars engaging the outer face of said front wall has the opposite ends thereof bifurcated to engage over said heating element.

4. A device as claimed in claim 1 wherein the means electrically connecting said power cable to said electric heating element includes a thermostatic control for regulating the flow of electricity through said power cable.

References Cited in the file of this patent

UNITED STATES PATENTS

| | | |
|---|---|---|
| 2,232,998 | Cernohouz et al. | Feb. 25, 1941 |
| 2,757,271 | Fitzgerald | July 31, 1956 |
| 2,794,897 | Giles | June 4, 1957 |
| 2,805,314 | Michaelis | Sept. 3, 1957 |